United States Patent Office 3,547,902
Patented Dec. 15, 1970

3,547,902
COUMARIN DERIVATIVES
Henry Schmitz, Syracuse, and Robert Larry Devault, North Syracuse, N.Y., assignors to Bristol-Myers Company, New York, N.Y., a corporation of Delaware
No Drawing. Filed Dec. 16, 1968, Ser. No. 784,224
Int. Cl. C07c 47/18
U.S. Cl. 260—210         11 Claims

ABSTRACT OF THE DISCLOSURE

Compounds of the formula

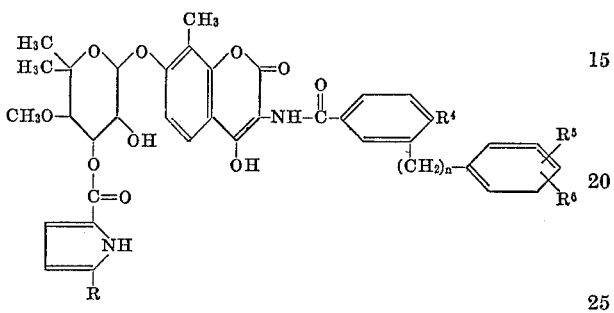

wherein
R is hydrogen or methyl;
n is an integer of 0 to 8;
$R^4$ is hydroxy or (lower)alkanoyloxy,
$R^5$ and $R^6$ are alike or different and each represents hydrogen, fluoro, chloro, bromo, iodo, trifluoromethyl, amino, N,N-di(lower)alkylamino, nitro, cyano, hydroxy, carboxy, carb-(lower)alkoxy, acetoxy, or a nontoxic, pharmaceutically acceptable salt thereof; are prepared by mixing either the compound having the formula

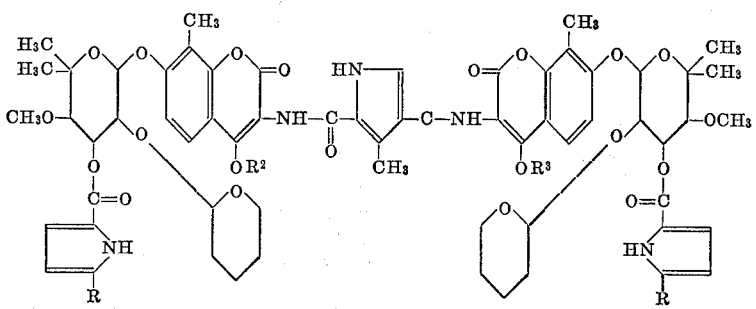

wherein
R is hydrogen or methyl, and
$R^2$ and $R^3$ are the same or different and are either —H or

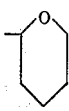

or the compound having the formula

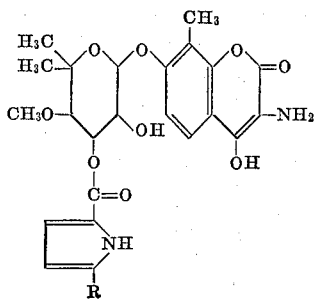

in which R is hydrogen or methyl; with an acid halide having the formula

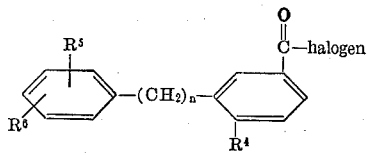

or its functional equivalent as an acylating agent, in which $R^4$, $R^5$ and $R^6$ are as defined above.

BACKGROUND OF THE INVENTION

Field of the invention

This invention relates to novel synthetic compounds of value as antibacterial agents, as nutritional supplements in animal feeds, as agents for the treatment of mastitis in cattle and as therapeutic agents in poultry and animals, including man, in the treatment of infectious diseases caused by gram-positive and some gram-negative bacteria.

There exists a need to provide alternative and improved agents for the treatment of infections caused by gram-positive bacteria (including those resistant to benzylpenicillin) and by gram-negative bacteria and for the decontamination of objects bearing such organisms, e.g. hospital equipment, walls of operating rooms and the like.

Of particular need are antibacterial agents which exhibit good oral absorption in animals.

Description of the prior art

The antibiotic substances coumermycin $A_1$ and $A_2$ are described in U.S. Pat. 3,201,386. The tetrahydropyranyl ether derivatives of these compounds are described in U.S. Pat. 3,380,994.

SUMMARY OF THE INVENTION

This invention relates to phenylalkylbenzoyl derivatives of 3-amino-4-hydroxy-8-methyl-7-[3-O-(5-methyl-2-pyrrolycarbonyl)noviosyloxy]coumarin. It relates further to the use of these compounds as antibacterial agents.

This invention relates to antibacterial agents which are derivatives of the antibiotic substances coumermycin $A_1$ and coumermycin $A_2$ (U.S. Pat. 3,201,386) and to processes for their production. More particularly it relates to products resulting from the acylative cleavage of the tetrahydropyranyl ethers of coumermycins $A_1$ and $A_2$ and to the process of preparing same by the reaction of an acylating agent of the benzoic acid series with said tetrahydropyranyl (THP) derivatives (U.S. Pat. 3,380,994), or alternatively products resulting from the acylation of the compound 3 - amino-4-hydroxy-8-methyl-7-[3-O-(5-methyl - 2 - pyrrolylcarbonyl)noviosyloxy] - coumarin (U.S. Ser. No. 624,153 filed Mar. 20, 1967, now U.S. Pat. No. 3,454,548).

Coumermycin $A_1$ (R is methyl) and coumermycin $A_2$ (R is hydrogen)

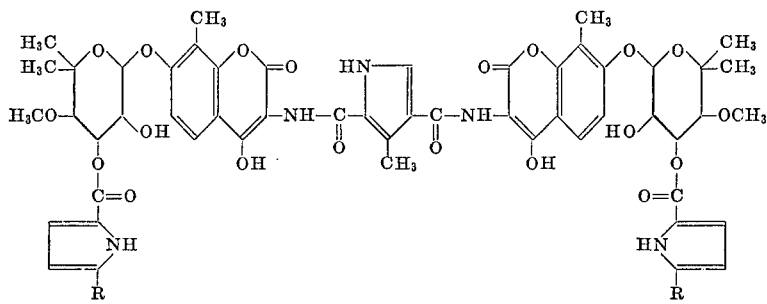

are effective in inhibiting the growth of gram-positive bacteria. Both are nontoxic and exhibit a therapeutic effect on mice infected with gram-positive bacteria. A major disadvantage of the coumermycins however is their poor absorption and resultant low blood levels. Efforts to correct these deficiencies have resulted according to the present invention, in new and novel N-benzoyl cleavage products of the parent coumermycins, said compounds being antibacterial agents active against *Staphylococcus aureus* Smith.

These objectives were obtained by the provision, according to the present invention, of the compounds having the formula

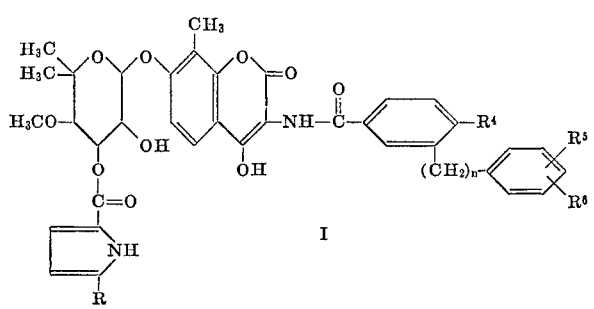

wherein R is either hydrogen or methyl.

$R^4$ is hydroxy or (lower) alkanoyloxy; and each of $R^5$ and $R^6$ represents hydrogen, fluoro, chloro, bromo, iodo, trifluoromethyl, trichloromethyl, amino, N-(lower)alkylamino, N,N-di(lower)-alkylamino, nitro, cyano, hydroxy, carboxamido, N-(lower)alkylcarboxamido, N,N-di(lower)alkylcarboxamido, carboxy, carb(lower)alkoxy, acetoxy, n is an integer of 0 to 8; and the nontoxic, pharmaceutically acceptable cationic salts thereof.

A more limited and preferred embodiment of the present invention comprises the compounds having the Formula I, wherein R is either hydrogen or methyl, and $R^4$ is hydroxy or (lower)alkanoyloxy and each of $R^5$ and $R^6$ represents hydrogen, fluoro, chloro, bromo, iodo, trifluoromethyl, N,N-di-(lower)alkylamino, nitro, cyano, hydroxy, carboxy, carb(lower)alkoxy, acetoxy, and n is an integer of 0 to 6; and the nontoxic pharmaceutically acceptable cationic salts thereof.

A further limited and preferred embodiment of the present invention comprises the compounds having the Formula I, wherein R is either hydrogen or methyl, and $R^4$ is hydroxy or (lower)alkanoyloxy, and each of $R^5$ and $R^6$ represents hydrogen, fluoro, chloro, bromo, iodo, trifluoromethyl, amino, N,N-di(lower)alkylamino, nitro, cyano, N,N-di-(lower)alkylcarboxamido, carb(lower)alkoxy, acetoxy, n is an integer of 0 to 6; and the nontoxic, pharmaceutically acceptable cationic salts thereof.

A particularly preferred embodiment of the present invention is the group of compounds having the formula

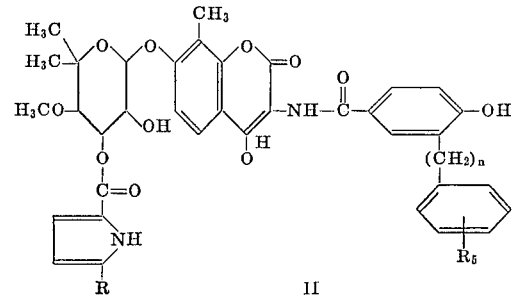

wherein
R is hydrogen or methyl,
$R^5$ represents hydrogen, fluoro, chloro, bromo, iodo, trifluoromethyl, amino, N,N-di(lower)-alkylamino, nitro, cyano, hydroxy, carboxy, carb-(lower)alkoxy or acetoxy;
n is an integer of 2 to 6; and the nontoxic, pharmaceutically acceptable cationic salts thereof.

Another preferred group of compounds within the scope of the present invention comprises the compounds having the Formula II, wherein R is methyl, $R^5$ represents hydrogen, fluoro, chloro, bromo, iodo, trifluoromethyl, amino, N,N-di(lower)alkylamino, nitro, cyano, hydroxy, carboxy, carb(lower)alkoxy, acetoxy; n is an integer of 2 to 4; and the nontoxic pharmaceutically acceptable cationic salts thereof.

A most preferred embodiment of the present invention is the compound having the Formula II, wherein $R^5$ is hydrogen and n is an integer of 2; and the nontoxic, pharmaceutically acceptable salts thereof.

The term "(lower)alkyl" as used herein means both straight and branched chain aliphatic hydrocarbon radicals having from one to eight carbon atoms such as methyl, ethyl, propyl, isopropyl, butyl, isobutyl, t-butyl, amyl, hexyl, etc. Where the term "(lower)" is used as part of the description of another group, e.g. "(lower)-alkoyl," it refers to the alkyl portion of such group which is therefore as described above in connection with "(lower)alkyl" and thus includes such radicals as methoxy, ethoxy, isopropoxy etc.

The compounds of the present invention are prepared by the process which comprises the consecutive steps of mixing together a compound having the formula

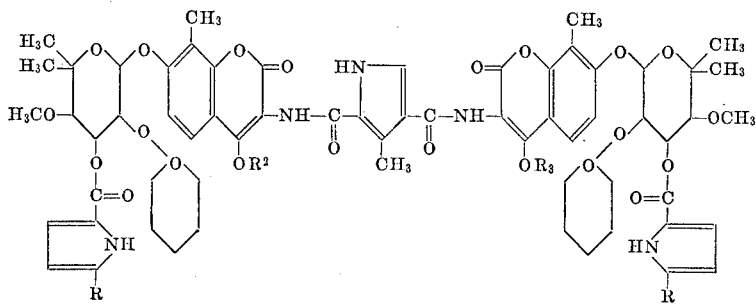

as an alcohol, in the presence of a catalytic amount of an acid cleaves the tetrahydropyranyl ether linkage to produce a compound having the Formula I.

Compounds having the Formula I possess potent antibacterial activity, e.g., against *Staphylococcus aureus*.

wherein

R is hydrogen or methyl, and $R^2$ and $R^3$ are the same or different and are either —H or

with an acid halide having the formula

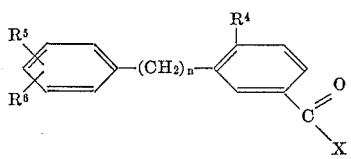

in which X is chloro, bromo or iodo, $R^4$ is (lower)-alkanoyloxy, and $n$ is an integer of 0 to 8; or its functional equivalent as an acylating agent in which each of $R^5$ and $R^6$ represent hydrogen, fluoro, chloro, bromo, iodo, trifluoromethyl, trichloromethyl, di(lower)alkylamino, nitro, cyano, acetoxy, N,N-di(lower)alkylcarboxamido or carb(lower)alkoxy to produce a compound having the formula

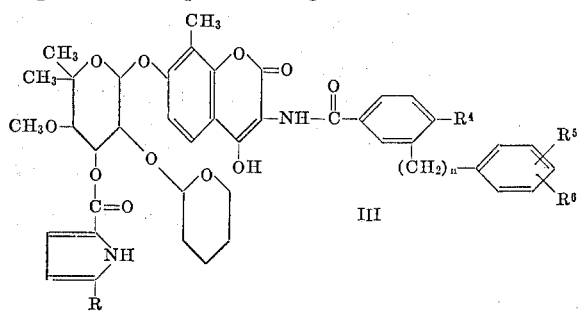

wherein R, $R^4$, $R^5$, $R^6$ and $n$ are as described above; and allowing said tetrahydropyranyl ether to stand in a polar solvent in the presence of a catalytic amount of an acid to produce a compound having the Formula I.

Thus mixing together a 2′,2′,4,4-O,O,O,O-tetratetrahydropyranylcoumermycin, or a 2′,2′,4-O,O,O-tritetrahydropyranylocumermycin or a 2′,2′-O,O-di-tetrahydropyranylcoumermycin, or mixtures thereof, an excess of an unsubstituted or substituted acid halide or acid anhydride, or their functional equivalents as acylating agents for the production of N-mono-substituted amides, in a proton-accepting solvent for several hours at about room temperature or at elevated temperatures produces a compound having the formula III and subsequently allowing the above compound III to stand in a polar solvent, such They are well absorbed and produce good blood levels upon oral or parenteral administration to mammals.

Some of the compounds prepared by the process described above are readily modified into compounds containing moieties referred to above in Formula I. Said compounds are also considered an integral part of the instant invention.

When compounds having Formula I contain a nitro, cyano, acetoxy, or carb(lower)alkoxy function in the Ar group, it is possible to change the above functions to a new species.

Mild hydrolysis of the acetoxy and carb(lower)alkoxy functions will produce compounds containing hydroxy and carboxy functions respectively. Similarly reduction of a nitro function will produce an amino function.

Amination of the resultant carboxy function above may produce N-substituted or unsubstituted carboxamido functions. N-alkylation of the amino function above will produce N-(lower)alkylamino or N,N-di(lower)alkylamino functions.

The compounds of the instant invention having the general Formula I all possess an acidic hydroxy function at the 4 position of the coumarin moiety. The acidic nature of the hydroxy allows one to readily prepare nontoxic, pharmaceutically acceptable, cationic salts of the compounds having the Formula I, e.g., sodium, potassium, calcium, aluminum and ammonium salts and their nontoxic substituted ammonium salts with an amine selected from the group consisting of trialkylamines, procaine, dibenzylamine, N-benzyl-betaphenethylamine, 1 - ephenamine, N,N′ - dibenzylethylenediamine, dehydroabietylamine, N,N′-bis-dehydroabietylethylenediamine and N-(lower)alkylpiperidines, e.g., N-ethylpiperidine.

The objectives of the present invention have been achieved, by the provision according to the present invention, of the process for the synthesis of compounds having the formula

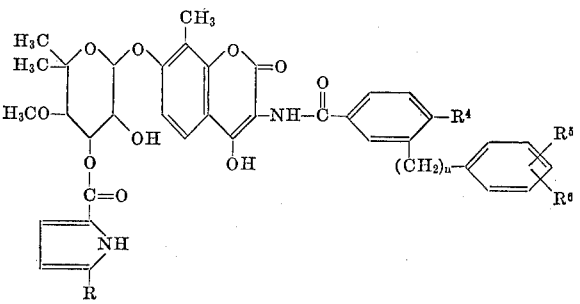

wherein

R is either hydrogen or methyl $n$ is an integer of 0 to 8, $R^4$ is hydroxy or (lower)alkanoyloxy, and
each of $R^5$ and $R^6$ represents hydrogen, fluoro, chloro, bromo, iodo, trifluoromethyl, trichloromethyl, N,N-di(lower)alkylamino, carb(lower)alkoxy, nitro, cyano, acetoxy or N,N-di(lower)alkylcarboxamido;
which comprises the consecutive steps of:
(a) mixing together a compound having the formula

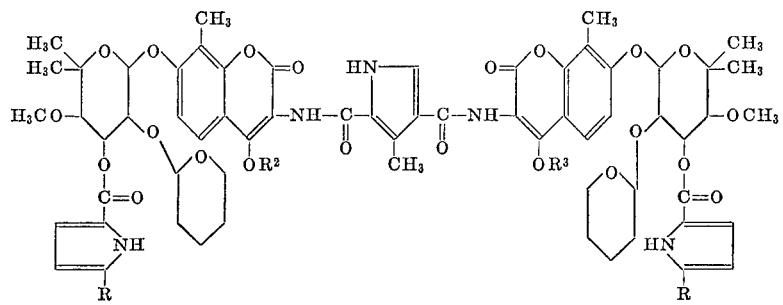

wherein
R is hydrogen or methyl, and
$R^2$ and $R^3$ are the same or different and are either —H or

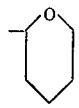

with an acid halide having the formula

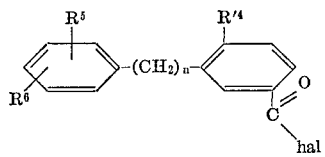

in which $R'^4$ is (lower)alkanoyloxy, and $R^5$ and $R^6$ and $n$ are as defined above; or its functional equivalent as an acylating agent,
functional equivalent being more specifically defined as a compound having the formula

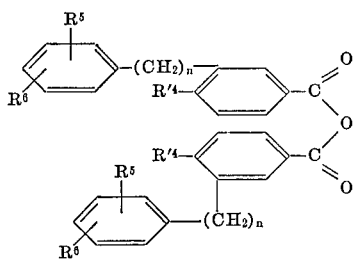

or

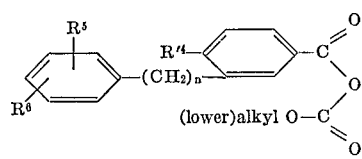

in which
$n$ is an integer of 0 to 8,
$R'^4$ is (lower)alkanoyloxy and
$R^5$ and $R^6$ each represents hydrogen, fluoro, chloro, bromo, iodo, trifluoromethyl, trichloromethyl, N,N-di(lower)alkylamino, nitro, cyano, acetoxy, N,N-di(lower)alkylcarboxamido or carb(lower)-alkoxy, in a homogeneous or heterogeneous system capable of inactivating protons, said system comprising an inorganic or organic base selected from the group consisting of an alkali carbonate or bicarbonate, alkali earth metal carbonate or bicarbonate, a pyridine or a tri(lower)alkylamine, alone or in combination with an inert solvent selected from the group consisting of tetrahydrofuran, benzene, toluene, xylene, ether, chloroform, etc., but preferably in a solvent system comprising a pyridine or a tri(lower)alkylamine alone or in combination with an inert solvent, at a temperature in the range of —20° C. to 150° C., but preferably in the range of —5° C. up to the boiling point of the solvent system used, to produce a compound having the formula

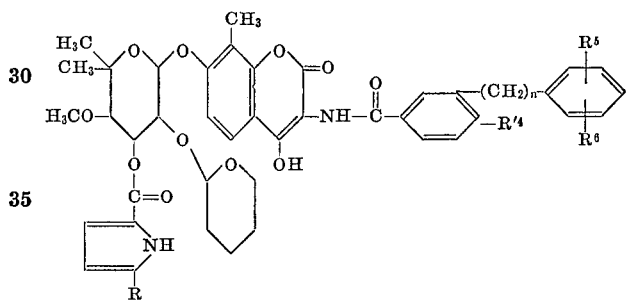

wherein R, $n$, $R'^4$, $R^5$ and $R^6$ are as described above; and
(b) allowing said tetrahydropyranyl ether to stand, preferably in homogeneous solution,
in a (lower)alkanol solvent, i.e., methanol, ethanol, etc., or in a co-solvent system containing an alcohol,
with or without the aid of heat, but preferably at a temperature in the range of 0° C. up to the boiling point of the solvent system used,
in the presence of a catalytic amount of an acid selected from the group consisting of mineral acids, arylsulfonic acids, Lewis acids, acid resins, activated carboxylic acids, or alkylsulfonic acids, but preferably arylsulfonic acids,
to produce a compound of the present invention having the formula

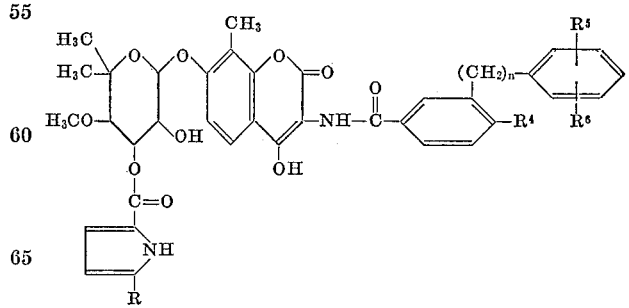

wherein $n$, R, $R^4$, $R^5$ and $R^6$ are as described above.
An integral part of the instant invention is the inclusion of those compounds directly derived from Formula I above which are defined as those compounds of Formula I, wherein each of $R^5$ and $R^6$ represents hydrogen, fluoro, chloro, bromo, iodo, trifluoromethyl, trichloromethyl, amino, N-(lower)alkylamino, N,N-di(lower)alkylamino, nitro, cyano, hydroxyl, carboxamido, N-(lower)alkylcarboxamido, N,N-di-(lower)alkylcarboxamido, carboxy, carb(lower)alkoxy or acetoxy; and $n$ is an integer of 0 to 8.

The process can be conducted under varying conditions, the most critical being the temperature at which the acylating step is performed. When lower temperatures in the range of −25° to 25° C. are employed, it is possible to isolate intermediates from the process that are not isolated when the process is conducted at higher temperatures, these intermediates being readily convertible to the desired N-benzoyl derivative by the use of heat and an organic nucleophile such as pyridine.

The process, at temperatures in the range of −25° to 25° C., is usually performed by dissolving or suspending 2′,2′,4,4 - O,O,O,O - tetratetrahydropyranylcoumermycin, or 2′,2′,4 - O,O,O-tritetrahydropyranylcoumermycin or 2′,2′-O,O-ditetrahydropyranylcoumermycin, or mixtures thereof, in a proton-accepting solvent (organic nucleophile) usually selected from the group consisting of a pyridine, or (lower)trialkylamine such as trimethylamine, triethylamine, or one of these in combination with an inert solvent, an example, of which may be tetrahydrofuran, benzene, toluene, xylene, chloroform, or ether. The mixture is cooled to about 10° C. by an ice-water bath. An excess of an unsubstituted or substituted benzoyl halide or benzoic acid anhydride, or its functional equivalent, preferably in a ratio of two to four moles of acylating agent to one mole of coumermycin tetrahydropyranyl ether, is added with vigorous stirring. Stirring is maintained for several hours following which the solution is concentrated to a syrup by evaporation in vacuo at temperatures below 25° C. The material isolated by this technique is characterized as a bis-imide, having the Formula IV

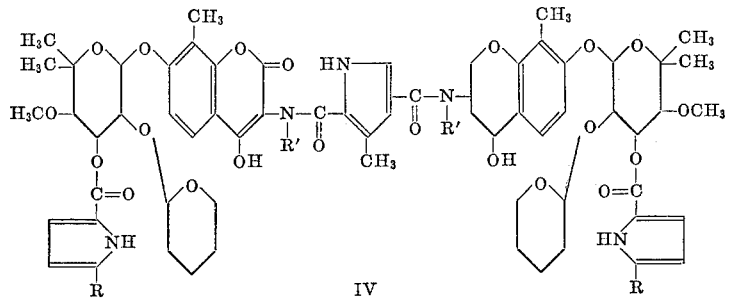

wherein R is hydrogen or methyl and R′ is

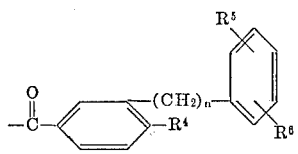

$n$, $R^4$, $R^5$ and $R^6$ being defined above.

Warming the isolated bis-imide IV in a water-wet proton accepting organic solvent from the group described above at 50° C. overnight, or by refluxing in said solvent for a minimum time of three hours, results in the formation of compounds having the Formula III.

Mixing the above compound III in a polar solvent such as a (lower)alkanol, i.e., methanol, ethanol, propanol, etc., in the presence of a catalytic amount of an acid, with or without the aid of heat, produces compounds having the Formula I.

The addition of a suitable acid is necessary to catalyze the cleavage of the tetrahydropyranyl group from compound III. The acid employed is usually selected from one of the following groups (1) Concentrated Mineral Acids such as sulfuric acid, phosphoric acid, phosphorous acid, and hydrochloric acid.

(2) Arylsulfonic Acids having the following formula

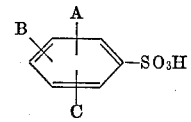

in which each of A, B and C are alike or different and are hydrogen, halogen, (lower)alkyl, (lower)alkoxy, nitro, aryl or cyano.

(3) Lewis Acids such as $SnCl_4$, $AlCl_3$, $BF_3$, $ZnCl_2$, $FeCl_3$.

(4) Acid Resins in their acidic form (H+) such as the phenolic sulfonic acids, polystyrene sulfonic acids, polystyrene phosphorous acids, polystyrene phosphonic acids, acrylic carboxylic acids, polystyrene nuclear sulfonic acids, methacrylic carboxylic acid and in particular macroreticular polystyrene sulfonic acid ("Amberlyst 15"—Rohm and Haas).

(5) Activated Carboxylic Acids such as $F_3C$—$CO_2H$, $F_2CHCO_2H$,

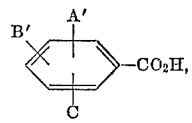

wherein A′, B′ and C′ are alike or different but are nitro, fluoro, cyano or hydrogen.

(6) Alkylsulfonic Acids having the formula $$R\text{—}(CH_2)_xSO_3H$$

wherein R is selected from the group consisting of aryl, substituted aryl, (lower)alkyl, substituted (lower)alkyl; and where $x$ is a whole integer of 0 to 6 inclusive.

The process, at temperatures above 25° C., and up to the boiling point of the solvent employed, is usually performed by dissolving or suspending 2′,2′,4,4 - O,O,O,O-tetratetrahydropyranylcoumermycin, or 2′,2′,4 - O,O,O-tritetrahydropyranylcoumermycin, or 2′,2′-O,O - ditetrahydropyranylcoumermycin, or mixtures thereof in a proton accepting solvent (organic nucleophile) usually selected from the group consisting of a pyridine, or (lower)-trialkylamine such as trimethylamine, triethylamine; or one of these in combination with an inert solvent, an example of which may be tetrahydrofuran, benzene, toluene, xylene, chloroform or ether.

An excess of an unsubstituted or substituted acid halide or acid anhydride, or its functional equivalent, preferably in a ratio of two to four moles of acylating agent to one mole of coumermycin tetrahydropyranyl ether, is added to the tetrahydropyranyl ether mixture with vigorous stirring. The resultant mixture is slowly warmed to temperatures up to the boiling point of the solvent employed for a period of time usually in excess of thirty minutes but rarely longer than 40 hours, during which time the solution turns orange to brown in color. The solution is evaporated in vacuo to a syrup and poured into vigorously stirred ice-water. The solid product collected is characterized as material of Formula II, in addition to lesser quantities of impurities.

The impure product is subsequently purified by fractional crystallization, chromatography or some other equivalent method. The material of Formula II is then dissolved in a polar solvent such as a (lower)alkanol, i.e., methanol, ethanol, propanol, etc., in the presence of a catalytic amount of an acid from the group described previously, with or without the aid of heat, to produce a compound of Formula I.

While the acylative cleavage proceeds readily by both of the above detailed procedures, it has been observed that the process proceeds most readily with the highest percentage yields of desired product and with the lowest quantity of decomposition products when a small quantity of water is added to the mixture of the coumermycin tetrahydropyranyl ether just prior to the addition of the acylating agent. Furthermore, it has been observed that when the ratio of acylating agent to coumermycin tetrahydropyranyl ether is kept below 5:1, the quantity of impurity formed is kept minimal.

The resultant products of the instant invention described herein have been found to exist in various states of hydration, i.e., anhydrous, monohydrated, and polyhydrated. For the purpose of the disclosure, the invention is considered to embody all such forms as an integral part of same.

The tetrahydropyranyl ethers of coumermycin $A_1$ and $A_2$ described herein do not form part of the present invention. They are the invention of our colleague Donald Edward Nettleton, Jr. and are disclosed and claimed in his U.S. Pat. 3,380,994, issued Apr. 30, 1968.

The compounds of the present invention can be prepared by an alternative synthetic route by the direct acylation of 3-amino-4-hydroxy - 8 - methyl-7-[3-O-(5-methyl-2-pyrrolylcarbonyl)noviosyloxy]coumarin (subject matter of U.S. patent application, Ser. No. 624,153, filed Mar. 20, 1967, now U.S. Pat. No. 3,454,548).

3-amino-4-hydroxy - 8 - methyl-7-[3-O-(5-methyl-2-pyrrolylcarbonyl)noviosyloxy]coumarin, a compound having the structure

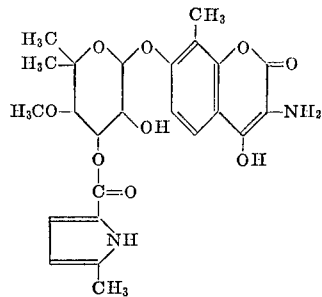

VII is dissolved in pyridine and acylated directly using a small molar excess of the appropriate acylating agent having the formula

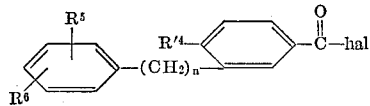

in which $n$, $R^4$, $R^5$ and $R^6$ are as described above, and hal is a halogen such as chloro, bromo or iodo; or its functional equivalent, to produce the compounds of the present invention.

PREPARATION OF ACYLATING AGENTS

The acylating agents employed in the process of the instant invention were prepared, when not available commercially, from the corresponding acid derivative by generally known procedures.

(a) The acid halides were prepared by mixing together the appropriate acid with thionyl halide, with or without the aid of heat, followed by purification by distillation or by crystallization from an inert solvent, i.e., benzene, "Skellysolve B," etc.

(b) The acid anhydrides were prepared by mixing together the appropriate acid with acetic anhydride, with or without the aid of heat, usually followed by purification by crystallization from an inert solvent, i.e., benzene, "Skellysolve B," ethyl acetate, etc.

(c) The mixed acid anhydrides were prepared by mixing together the appropriate acid with ethyl chloroformate in the presence of pyridine with or without the aid of heat, usually followed by "in situ" use on the desired tetrahydropyranylcoumermycin $A_1$ or $A_2$.

The assay used in the examples below is a modified coumermycin $A_1$ assay which is run on Petri plates prepared by using ten ml. of Baltimore Biological Laboratories (BBL) base agar and a top layer of four ml. of BBL seed agar inoculated with *Staph. aureus* ATCC 6538P. The plates are incubated for 18 hours at 30° C. The compound used as the standard for the assay of the compounds of the present invention is 3-benzamido-4-hydroxy-8-methyl-7-[3-O-(5 - methyl - 2 - pyrrolylcarbonyl)-noviosyloxy]coumarin (BL-C3, VIII) and it is assigned an activity value of 1000 mcg./mg. All values for the compounds of the present invention are expressed in terms of BL-C3 units.

In the treatment of bacterial infections in mammals, including man, the compounds of this invention are administered orally or parenterally, in accordance with conventional procedures for antibiotic administration, in an amount of from about 5 to 60 mg./kg./day, and preferably about 20 mg./kg./day in divided doses, e.g., three or four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The following examples will serve to illustrate but not to limit the scope of the present invention.

DESCRIPTION OF THE PREFERRED EMBODIMENTS

EXAMPLE 1

(A) Bis-carbobenzoximide of coumermycin $A_1$

Monosodium coumermycin $A_1$ (60 g., 0.053 mole) was dissolved in 1250 ml. of tetrahydrofuran (THF) with

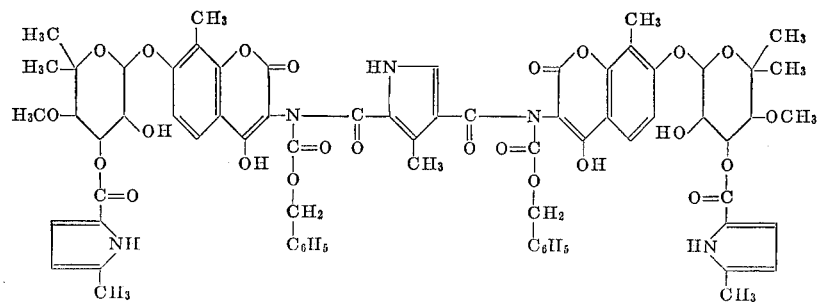

slight warming on a steam bath. After allowing the deep yellow-gold solution to cool to 25° C., 44.6 ml. of triethylamine (6 equivalents) was carefully added with vigorous stirring. The mixture immediately started to gel, although rapid stirring kept the gel mobile.

Five equivalents (36 ml.) of benzylchloroformate, diluted to 250 ml. volume with THF, was added dropwise to the vigorously stirred gel-solution at 25° C. over a 30 minute period.

After one hour, the gel disappeared and the presence of triethylamine hydrochloride precipitate was noted. The stirring of the yellow solution was continued at 25° C. for an additional 24 hours.

The solution was filtered to remove the triethylamine hydrochloride, and then concentrated in vacuo to approximately one-tenth its original volume. The light yellow-orange solution was poured into 3000 ml. of Skellysolve-B with vigorous stirring. An immediate precipitate of a light cream-colored solid appeared. After stirring for one hour at 25° C. it was filtered, washed with four 100 ml. portions of n-hexane, and dried to yield 77.4 g. of semi-pure biscarbobenzoximidocoumermycin $A_1$ (as illustrated above). M.P.: Softens at 145°–150° C., decomposes with effervescence at 190°–200° C. It is probable that this solid, consisting mainly of the desired product, was contaminated by small quantities of tri- and tetra-substituted carbobenzoxy side products, since one or both of the 4-hydroxyl function of the coumarin moieties of coumermycin $A_1$ is capable of being carbobenzoxylated as well. It is noted however, that these small quantities of side products do not interfere with the subsequent steps of the process and are either eliminated or converted back to desired product as a matter of course as the process is practiced. The infrared spectrum (IR) of the solid product showed a very weak amide II band near 1530 cm.$^{-1}$ indicating the presence of little, if any, starting material. *Staph. aureus* plate assay 2.5 to 5.0 mcg./mg.

(B) 3 - carbobenzoxamido - 4 - hydroxy-8-methyl-7-[3-O - (5 - methyl - 2 - pyrrolylcarbonyl)noviosyloxy] coumarin

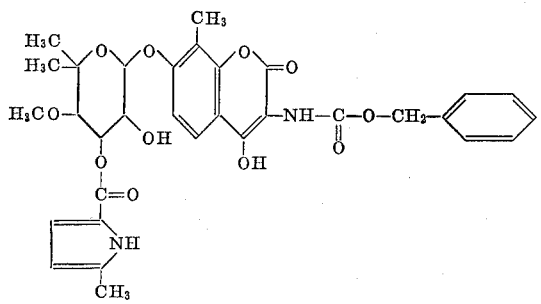

Seventy-five grams of the bis-carbobenzoximide of coumermycin $A_1$ obtained in Example I was dissolved in 1200 ml. of pyridine at 25° C. to make a light orange-colored solution. It was warmed to 50–55° C. for at least twenty-four hours during which time it was stirred.

The resultant orange-brown solution was concentrated in vacuo to about one-fifth its original volume and was poured into 3000 ml. of ice water with vigorous stirring. The pH was adjusted to pH 1 to 2 with 6 N-hydrochloric acid, then stirred for an additional hour.

The suspension was filtered to yield 57.9 g. of light cream-tan colored solids which were dried in vacuo to constant weight.

The carbobenzoxamido derivative is quite chloroform-soluble while the undesired side products are not. The whole solids (50.0 grams) were placed in a Soxhlet extraction apparatus and continuously extracted until the materials extracted from the whole became negligible. Evaporation of the chloroform extracts produced approximately 15 g. of chloroform soluble materials. This residue was redissolved in a small portion of chloroform and extracted with 5% aqueous sodium bicarbonate to remove any acidic impurities. The chloroform solution was dried over anhydrous sodium sulfate and fractionally precipitated from solution by the addition of increasing amounts of "Skellysolve-B" (petroleum solvent, B.P. 60° C. to 68° C., essentially n-hexane) to yield a pure fraction, 4.5 g. of material identified as 3-carbobenzoximido-4 - hydroxy-8-methyl-7-[3-O-(5-methyl-2-pyrrolylcarbonyl)noviosyloxy]coumarin as a white, crystalline solid, M.P.: softens at 110° C., gelling at 125° C., melts with effervescence at 155° C. to 160° C.

The infrared (IR) and nuclear magnetic resonance (NMR) spectra were consistent with the structure of the title compound.

*Analysis.*—Calc'd for $C_{32}H_{34}O_{11}N_2$ (percent): C, 61.73; H, 5.51; N, 4.50. Found (percent): C, 61.14; H, 5.65; N, 4.83.

(C) 3-amino-4-hydroxy-8-methyl-7-[3-O-(5-methyl-2-pyrrolylcarbonyl)noviosyloxy]coumarin (platinum oxide catalyst)

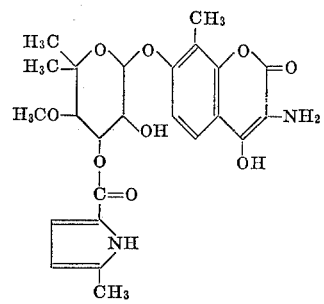

3-carbobenzoxamido-4-hydroxy - 8 - methyl-7-[3-O-(5-methyl-2-pyrrolylcarbonyl)noviosyloxy]coumarin (1.8 g., 2.90 mmoles), obtained from Example 4, was dissolved in 150 ml. of glacial acetic acid to produce a pale yellow solution. To this solution was added 500 mg. of platinum oxide catalyst and the resultant solution-suspension treated with hydrogen in a Parr hydrogenation apparatus at an initial pressure of 52.5 lb./in.$^2$. The reduction was run for 24 hours at room temperature with agitation. The total uptake of hydrogen was 15.7 lb./in.$^2$.

The catalyst was removed by filtration over a filter-aid pad under a nitrogen atmosphere, and the solution was immediately evaporated in vacuo. Twenty ml. of acetone was added to the residue and it was again evaporated to dryness in vacuo. The procedure was repeated four more times. The resultant residue was dried in vacuo over sodium hydroxide to yield 1.0 g. of a light yellow-gold solid, M.P. 196–200° C. IR and NMR analysis of this solid was consistent with the structure of the title compound, 3 - amino-4-hydroxy-8-methyl-7-[3-O-(methyl-2-pyrrolylcarbonyl)noviosyloxy]coumarin. It is sensitive to oxidation, particularly when in solution.

*Analysis.*—Calc'd for $C_{24}H_{28}O_9N_2$ (percent): C, 59.01; H, 5.79; N, 5.74. Found (percent): C, 58.39; H, 6.02; N, 4.70.

*Analysis.*—Calc'd for $C_{24}H_{28}O_9N_2 \cdot \frac{1}{2}H_2O$ (percent): C, 57.94; H, 5.88; N, 5.63.

EXAMPLE 2

3-benzamido-4-hydroxy-8-methyl-7-[3-O-(5-methyl-2-pyrrolylcarbonyl)noviosyloxy]coumarin (VIII)

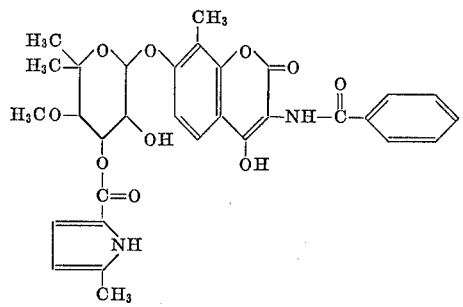

VIII

3 - amino-4-hydroxy-8-methyl-7-[3-O-(5-methyl-2-pyrrolylcarbonyl)noviosyloxy]coumarin (250 mg., 0.51 mmole), obtained from Example 5, was dissolved in 10 ml. of pyridine.

To this solution was added benzoic anhydride (139 mg., 0.613 mmole) with vigorous stirring at 25° C. The reaction was stirred at room temperature for a total of 70 hours under an $N_2$ atmosphere and then poured into 150 mg. of ice water containing 20 ml. of 6 N hydrochloric acid. The mixture was stirred for one hour and the precipitate collected by vacuum filtration to yield 253 mg. of a light peach-colored solid that was identified as 3-benzamido-4-hydroxy-8-methyl-7-[3-O-(5-methyl-2-pyrrolylcarbonyl)noviosyloxy]coumarin, M.P.: tans and softens 190° C., browns beginning at 210° C., finally decomposes vigorously at 230° C. to 235° C. (turns black). Staph. aureus assay 44 μg./mg. (coumermycin $A_1$ standard). This compound was arbitrarily established as the reference standard for the semi-synthetic coumermycin derivatives of the present invention.

*Analysis.*—Calc'd for $C_{31}H_{32}O_{10}N_2$ (percent): C, 62.83; H, 5.45; N, 4.73. Found (percent): C, 63.49; H, 5.78; N, 4.43.

EXAMPLE 3

(A) Preparation of 4-hydroxy-3-phenylacetylbenzoic acid

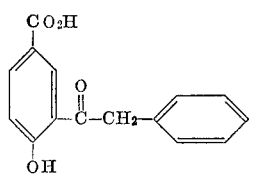

Ethyl-p-hydroxybenzoate (33.2 grams) was dissolved in 300 ml. of tetrachloroethane and phenylacetyl chloride (34 grams) was added. To this stirred mixture was added 56 grams of aluminum chloride in small portions at room temperature. The mixture was then heated and maintained at 120° C. for four hours.

The solution was then cooled and poured over ice. The mixture was acidified by the addition of 300 ml. of concentrated hydrochloric acid. The solids that were insoluble in the mixture were collected by filtration and subsequently digested in 5% sodium carbonate solution. The sodium carbonate solution was filtered, the filtrate acidified to pH 2.0, and the resultant solids collected by filtration to yield 0.376 gram of solid.

The tetrachloroethane-acidic aqueous mixture was evaporated in vacuo to remove the tetrachloroethane solvent. The solids that formed were collected by filtration and were then digested in 5% sodium carbonate solution (1.5 liters) and filtered. The filtrate was acidified by the addition of 6 N HCl to yield 1.88 grams of solid. The 1.88 grams of solid were recrystallized from water-ethanol to yield 0.95 gram of 3-phenylacetyl-4-hydroxybenzoic acid, M.P. approximately 200° C. The infrared spectrum of the product showed carboxyl absorption at 1645 cm.$^{-1}$ and carbonyl absorption at 1690 cm.$^{-1}$.

*Analysis.*—Calc'd for $C_{15}H_{12}O_4$ (percent): C, 70.30; H, 4.72. Found (percent): C, 69.92; H, 4.98.

(B) Preparation of 4-hydroxy-3-β-phenylethylbenzoic acid

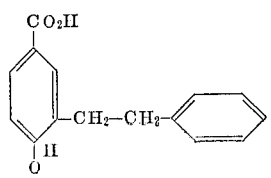

The 4-hydroxy-3-phenylacetylbenzoic acid (0.95 gram) obtained in Example 3 was dissolved in about 30 ml. of ethanol and then poured into about 20 ml. of water containing several grams of mossy zinc and mercury (Clemmenson Reduction). To this mixture was added about 50 ml. of concentrated hydrochloric acid, following which the solution was heated on a steam bath for several days. At the end of the heating period the solution was decanted from the remaining zinc-mercury amalgam. Both the amalgam and solution were thoroughly extracted with ether. The ether was removed in vacuo. As a precaution against the possible presence of any ester as a result of esterification occurring during the Clemmenson Reduction, the oil was saponified in 200 ml. of a 1:1 ethanol-1 N potassium hydroxide solution for about 2.5 hours. Following heating, the ethanol was removed in vacuo, the solution was acidified with concentrated hydrochloric acid, and the resulting suspension was extracted with ether. The ether solution was washed with water, and then concentrated in vacuo to an oil. The oil was crystallized from water-ethanol to produce crystals, M.P. about 132° C. The infrared spectrum of the product showed carboxyl absorption at 1670 cm.$^{-1}$.

*Analysis.*—Calc'd for $C_{15}H_{14}O_3$ (percent): C, 74.36; H, 5.83. Found (percent): C, 74.64; H, 5.73.

(C) Preparation of 4-acetoxy-3-β-phenylethylbenzoic acid

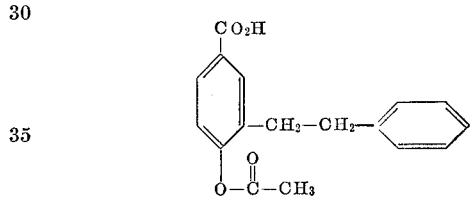

4-hydroxy-3-β-phenylethylbenzoic acid. 5.0 grams, comparable to that obtained in part B, was dissolved in pyridine (40 ml.) and acetic anhydride (20 ml.) for sixteen hours at room temperature. At the end of that time, the solution was poured over 200 grams of cracked ice, then extracted with three portions of 125 ml. of ether, and finally extracted from the ether into three portions of 100 ml. of 5% aqueous sodium bicarbonate. On acidification of the sodium bicarbonate solution, the 4-acetoxy-3-β-phenylethylbenzoic acid was obtained in nearly quantitative yield, about 5.2 grams. The infrared analysis indicated the 4-hydroxy group was acetylated.

(D) Preparation of 4-acetoxy-3-β-phenylethylbenzoyl chloride

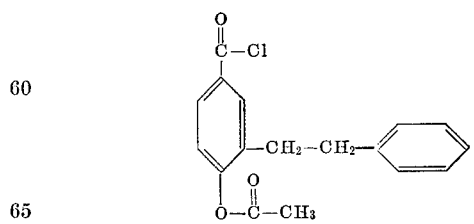

The 4-acetoxy-3-β-phenylethylbenzoic acid obtained in part C was dissolved in 50 ml. of thionyl chloride and heated to reflux for four hours. The excess thionyl chloride was removed by vacuum distillation and the last trace of the reagent was displaced by vacuum distillation with several portions of benzene (about 5.6 grams). The crude acid chloride was dissolved in 50 ml. of dry tetrahydrofuran and used as such in step E.

(E) Preparation of 3-(4-hydroxy-3-β-phenylethylbenz-amido)-4-hydroxy - 8 - methyl-7-[3-O-(5 - methyl-2-pyrrolylcarbonyl)noviosyloxy]coumarin

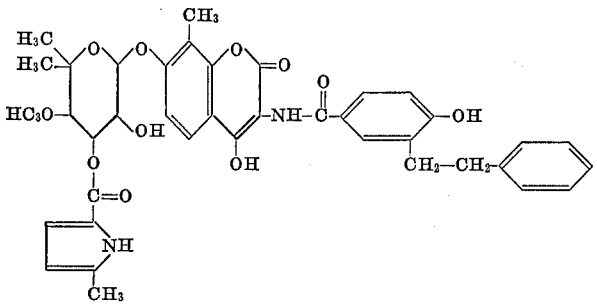

Ditetrahydropyranylcoumermycin $A_1$ (12.6 grams) was dissolved in 150 ml. of pyridine and then heated to reflux temperature. The solution of 4-acetoxy-3-β-phenyl-ethylbenzoyl chloride prepared in part D was added dropwise with stirring following which heating was continued for one hour.

The solution was poured into water and acidified to pH 1.0. The mixture was cooled for about one hour in an ice bath and the resultant precipitate collected by filtration. The precipitate was redissolved in 250 ml. of pyridine and heated at about 50° C. for about 20 hours. The pyridine was removed in vacuo to yield an oil which was dissolved in ethyl acetate. The ethyl acetate solution was extracted with several portions of 5% sodium bicarbonate solution. The ethyl acetate solution was washed with water and taken to dryness in vacuo. The residue was dissolved in 80 ml. of acetone and 20 ml. of methanol. A 1.0 gram portion of p-toluenesulfonic acid was added and the solution was stirred at 23° C. for about twenty hours. The product in solution was precipitated by the addition of about 1 liter of petroleum ether, essentially n-hexane, and the precipitate was collected by filtration. The solids were dissolved in about 100 ml. of liquid ammonia. That solid that was insoluble was left behind by decantation. The ammonia was allowed to evaporate over about a seventeen-hour period. The residues were dissolved in acetone and water and were acidified to pH 1.0. The precipitate was collected by filtration and then fractionally precipitated from n-hexane-ethyl acetate to produce five fractions. The third, fourth, and fifth fractions were essentially the desired title product, 1.1 grams combined, M.P. with decomposition 215° C.

Analysis.—Calc'd for $C_{39}H_{40}O_{11}N_2 \cdot 2H_2O$ (percent): C, 63.23; H, 5.99; N, 3.74. Found (percent): C, 63.41; H, 5.71; N, 3.98.

The nuclear magnetic resonance spectrum was consistent with the structure. Minimum Inhibitory Concentration (MIC) against Staphylococcus aureus was 0.0004 μg./ml. (pH 6.0).

EXAMPLE 4

Preparation of 3-(4-hydroxy-3-phenylmethylbenzamido)-4-hydroxy - 8 - methyl-7-[3,O-(5-methyl-2-pyrrolylcarbonyl)noviosyloxy]coumarin

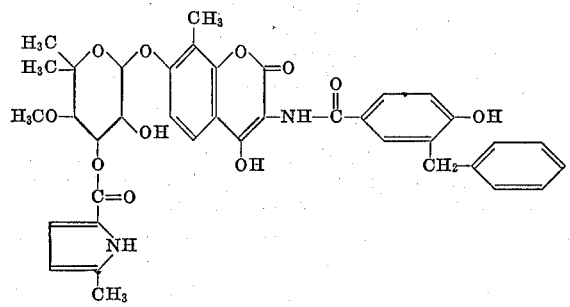

Substitution in the procedure of Example 3 for the phenylacetyl chloride used therein of benzoyl chloride produced 3-(4-hydroxy-3-phenylmethylbenzamido)-4-hydroxy - 8 - methyl-7-[3-O-(5-methyl-2-pyrrolylcarbonyl)-noviosyloxy]coumarin, M.P. 182° C. with decomposition.

Analysis.—Calc'd for $C_{38}H_{38}O_{11}N_2$ (percent): C, 65.32; H, 5.45. Found (percent): C, 65.00; H, 5.71.

MIC against Staphylococcus aureus was 0.0016 μg./ml. (pH 6.0).

EXAMPLE 5

Preparation of 3-(4-hydroxy - 3 - phenylbenzamido)-4-hydroxy - 8 - methyl-7-[3-O-(5-methyl-2-pyrrolylcarbonyl)noviosyloxy]coumarin

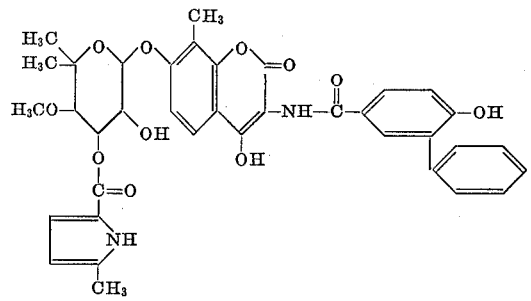

(A) Preparation of 4-hydroxy-1-phenylacetophenone

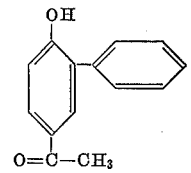

2-hydroxybiphenyl (1.25 moles) and acetic acid (1 mole) were heated to 65°–85° C. The solution was saturated with boron trifluoride for two hours. The mixture was poured over one liter of crushed ice with the resultant formation of an oil.

The oil was collected in ether, the ether solution washed with water, and then the ether solution was extracted with 1 N sodium hydroxide. Upon acidification of the sodium hydroxide extract with acid, crystalline ketone precipitated. Recrystallization of the crystalline material from boiling 95% ethanol by the addition of water to the cloud point, followed by cooling, produced 60 grams of 4-hydroxy-1-phenylacetophenone, M.P. 173° C.–174° C.

Analysis.—Calc'd for $C_{14}H_{12}O_2$ (percent): C, 79.22; H, 5.70. Found (percent): C, 79.24; H, 5.80.

(B) Preparation of 4-acetoxy-3-phenylbenzoic acid

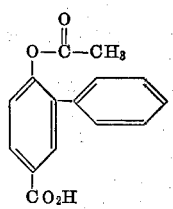

4-hydroxy-1 - phenylacetophenone (10.6 grams) and iodine (12.7 grams) were placed in 20 grams of pyridine and heated on a steam bath for forty-five minutes and then left to stand at room temperature overnight. The mixture was acidified, extracted into ether, and back-extracted into 5% aqueous sodium bicarbonate solution. The bicarbonate solution was acidified and solid 4-hydroxy - 3 - phenylbenzoic acid precipitated (8.1 grams). Some ring substitution by iodine had occurred but the pure desired product was easily purified as the acetoxy-acid in the next step.

The 4-hydroxy-3-phenylbenzoic acid was treated with 8 ml. of acetic anhydride and 2 ml. of pyridine for one hour with warming. The solution was poured onto ice. The yield was quantitative. Following three recrystallizations from benzene, the acetoxy acid melted at 184° C.–186° C.

*Analysis.*—Calc'd for $C_{15}H_{12}O_4$ (percent): C, 70.30; H, 4.72. Found (percent): C, 70.26; H, 4.77.

(C) Substitution in Example 3, part D, for the 4-acetoxy-3-β-phenylethylbenzoic acid used therein of 4-acetoxy-3-phenylbenzoic acid, produced 3-(4-hydroxy-3-phenylbenzamido) - 4 - hydroxy - 8-methyl-7-[3-O-(5-methyl-2-pyrrolylcarbonyl)noviosyloxy]-coumarin, M.P. 213° C. with decomposition.

The NMR and IR spectra were consistent with the structure above.

*Analysis.*—Calc'd for $C_{37}H_{36}O_{11}N_2$ (percent): C, 64.91; H, 5.26; N, 4.09. Found (percent): C, 64.57; H, 5.67; N, 4.18.

MIC against *Staphylococcus aureus* was 0.025 μg./ml. (pH 6.0).

EXAMPLE 6

Preparation of 3-[4-hydroxy-3-(4-chlorophenylmethyl)-benzamido] - 4 - hydroxy-8-methyl-7-[3-O-(5-methyl-2-pyrrolylcarbonyl)noviosyloxy]coumarin

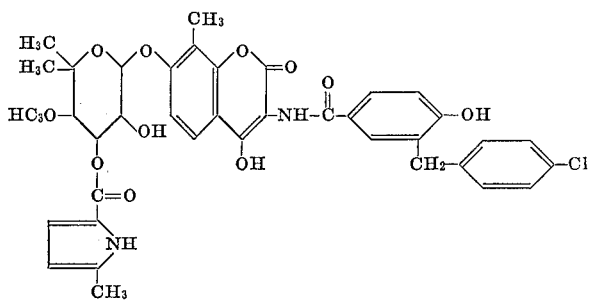

Substitution in the procedure of Example 3 for the phenylacetyl chloride used therein of 4 - chlorophenylacetyl chloride produced 3-[4-hydroxy-3-(4-chlorophenylmethyl)benzamido] - 4 - hydroxy - 8 - methyl-7-[3-O-(5 - methyl - 2-pyrrolylcarbonyl)noviosyloxy]coumarin, M.P. 180° C. with decomposition.

*Analysis.*—Calc'd for $C_{38}H_{37}O_{11}N_2Cl$ (percent): C, 62.25; H, 5.07; N, 3.81. Found (percent): C, 62.29; H, 5.12; N, 3.48.

MIC against *Staphylococcus aureus* was 0.0125 μg./ml. (pH 6.0).

EXAMPLE 7

Substitution in the procedure of Example 3, Step A, for the phenylacetyl chloride used therein of the acid chlorides 2,6-dichlorophenylacetyl chloride
4-trifluoromethylphenylacetyl chloride
3-nitrophenylacetyl chloride
2,4-difluorophenylacetyl chloride
2,6-difluorophenylacetyl chloride
4-acetoxyphenylacetyl chloride
3-cyanophenylacetyl chloride
2,6-dichlorobenzoyl chloride
4-trifluoromethylbenzoyl chloride
3-nitrobenzoyl chloride
2,6-difluorobenzoyl chloride
4-acetoxybenzoyl chloride
3-cyanobenzoyl chloride, or
2,4-difluorobenzoyl chloride produces respectively the compound having the formula

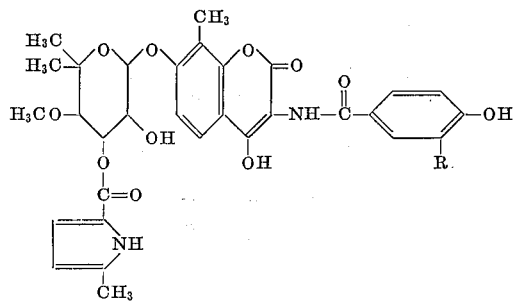

where R is 2,6-dichlorophenylethyl-,
4-trifluoromethylphenylethyl-,
3-nitrophenylethyl-,
2,4-difluorophenylethyl-,
2,6-difluorophenylethyl-,
4-acetoxyphenylethyl-,
3-cyanophenylethyl-,
2,6-dichlorophenylmethyl-,
4-trifluoromethylphenylmethyl-,
3-nitrophenylmethyl-,
2,6-difluorophenylmethyl-,
4-acetoxyphenylmethyl-,
3-cyanophenylmethyl-, or
2,4-difluorophenylmethyl-.

EXAMPLE 8

Preparation of 3-[4-hydroxy - 3-(β-3-aminophenylethyl)-benzamido] - 4 - hydroxy-8-methyl-7-[3-O-(5-methyl-2-pyrrolylcarbonyl)noviosyloxy]coumarin

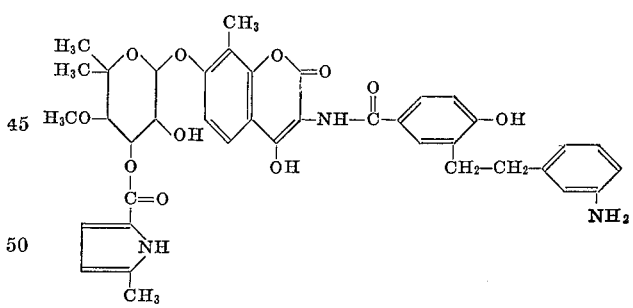

3 - [4-hydroxy-3-(β-3-nitrophenylethyl)-benzamido]-4-hydroxy - 8-methyl-7-[3-O-(5-methyl-2-pyrrolylcarbonyl)noviosyloxy]coumarin (0.01 mole) is dissolved in 200 ml. of absolute ethanol. A 650 mg. portion of palladium in carbon (5%) is added and hydrogenation conducted at 50 lb./in.². Hydrogenation with shaking is continued until the theoretical amount of hydrogen is absorbed. The catalyst is removed by filtration following which the solvent is removed in vacuo. The product is crystallized from ethyl acetate-n-hexane to yield the desired title compound.

EXAMPLE 9

Preparation of 3-[4-hydroxy-3-(2-chlorophenylmethyl)-benzamido] - 4-hydroxy-8-methyl-7-[3-O-(5-methyl-2-pyrrolylcarbonyl)noviosyloxy]coumarin Substitution in the procedure of Example 3, part A, for the phenylacetyl chloride used therein of 2-chlorobenzoyl chloride produced 3-[4-hydroxy-3-(chlorophenylmethyl)benzamido] - 4 - hydroxy - 8 - methyl-7-[3-O-(5-methyl-2-pyrrolylcarbonyl)noviosyloxy]coumarin, M.P. 140° C. with decomposition.

EXAMPLE 10

Preparation of 3-(4-hydroxy-3-β-phenethylbenzamido)-4-hydroxy - 8 - methyl - 7-[3-O-(5-methyl-2-pyrrolylcarbonyl)noviosyloxy]coumarin Substitution in the procedure of Example 2 for the benzoic anhydride used therein of 4-acetoxy-3-β-phenylethylbenzoyl chloride produced the title compound which was identical with the product produced in Example 3E.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. A compound having the formula

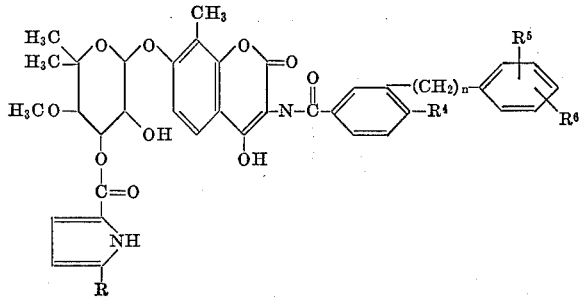

wherein R is either hydrogen or methyl, $R^4$ is hydroxy or (lower)alkanoxyloxy, each of $R^5$ and $R^6$ represents hydrogen, fluoro, chloro, bromo, iodo, trifluoromethyl, trichloromethyl, amino, N-(lower)alkylamino, N,N-di-(lower)alkylamino, nitro, cyano, hydroxy, carboxamido, N-(lower)alkylcarboxamido, N,N - di(lower)alkylcarboxamido, carboxy, carb(lower)alkoxy or acetoxy; $n$ is an integer of 0 to 8; or a nontoxic pharmaceutically-acceptable alkali metal, alkaline earth metal or tertiary amine salt thereof.

2. A compound of claim 1 having the formula

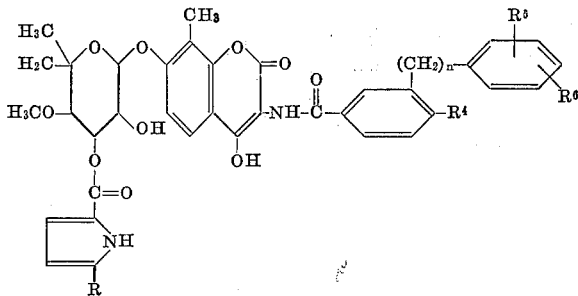

wherein R is either hydrogen or methyl, $R^4$ is hydroxy or (lower)alkanoyloxy; $n$ is an integer of 0 to 6; each of $R^5$ and $R^6$ represents hydrogen, fluoro, chloro, bromo, iodo, trifluoromethyl, amino, N,N-di(lower)alkylamino, nitro, cyano, hydroxy, carboxy, carb(lower)alkoxy or acetoxy; or a nontoxic pharmaceutically-acceptable alkali metal, alkaline earth metal or tertiary amine salt thereof.

3. A compound of claim 1 having the formula

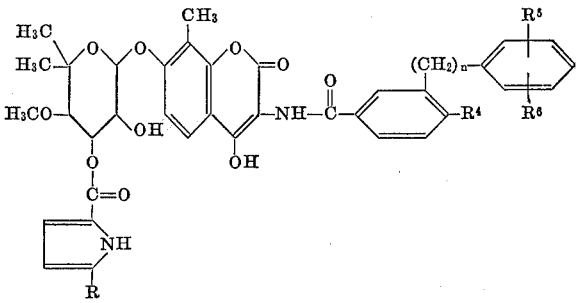

wherein R is either hydrogen or methyl, $R^4$ is hydroxy or (lower)alkanoyloxy; each of $R^5$ and $R^6$ represents hydrogen, fluoro, chloro, bromo, iodo, trifluoromethyl, N,N-di(lower)alkylamino, nitro, cyano, N,N-di(lower)alkylcarboxamido, carb(lower)alkoxy, acetoxy, or amino; $n$ is an integer of 0 to 6; or a nontoxic pharmaceutically-acceptable alkali metal, alkaline earth metal or tertiary amine salt thereof.

4. A compound of claim 1 having the formula

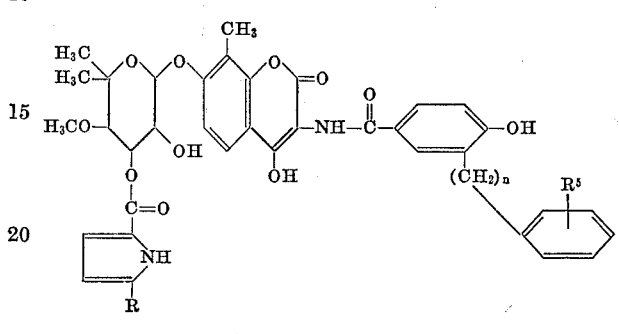

wherein R is either hydrogen or methyl; $R^5$ represents hydrogen, fluoro, chloro, bromo, iodo, trifluoromethyl, amino, N,N-di(lower)alkylamino, nitro, cyano, hydroxy, carboxy, carb(lower)alkoxy or acetoxy; $n$ is an integer of 2 to 6; or a nontoxic pharmaceutically-acceptable alkali metal, alkaline earth metal or tertiary amine salt thereof.

5. A compound of claim 1 having the formula

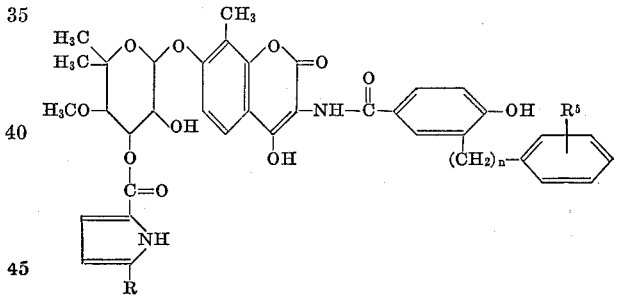

wherein R is methyl; $R^5$ represents hydrogen, fluoro, chloro, bromo, iodo, trifluoromethyl, amino, N,N-di(lower)alkylamino, nitro, cyano, hydroxy, carboxy, carb(lower)alkoxy or acetoxy; $n$ is an integer of 2 to 4; or a nontoxic pharmaceutically-acceptable alkali metal, alkaline earth metal or tertiary amine salt thereof.

6. A compound of claim 1 having the formula

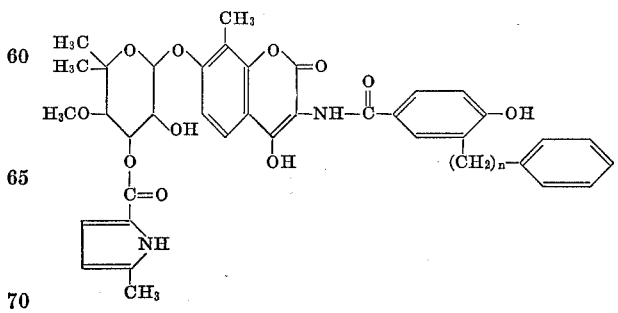

wherein $n$ is an integer of 2 to 4; or a nontoxic pharmaceutically-acceptable alkali metal, alkaline earth metal or tertiary amine salt thereof.

7. The compound having the formula

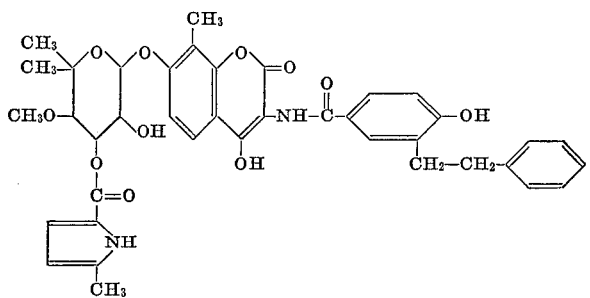

or a nontoxic pharmaceutically-acceptable alkali metal, alkaline earth metal or tertiary amine salt thereof.

8. The compound having the formula

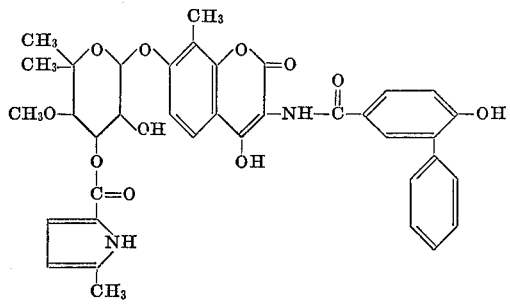

or a nontoxic pharmaceutically-acceptable alkali metal, alkaline earth metal or tertiary amine salt thereof.

9. The compound having the formula

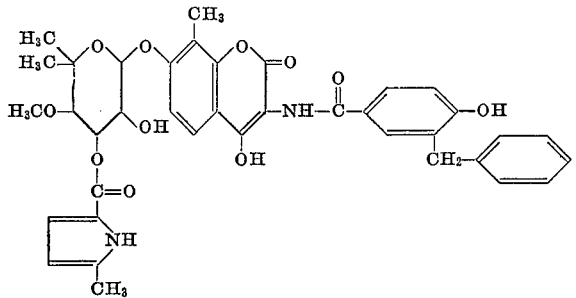

or a nontoxic pharmaceutically-acceptable alkali metal, alkaline earth metal or tertiary amine salt thereof.

10. The compound having the formula

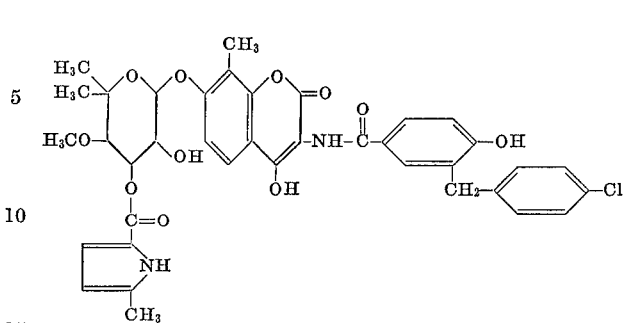

or a nontoxic pharmaceutically-acceptable alkali metal, alkaline earth metal or tertiary amine salt thereof.

11. The compound having the formula

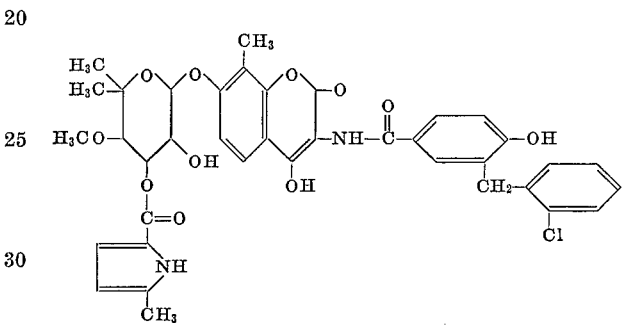

or a nontoxic pharmaceutically-acceptable alkali metal, alkaline earth metal or tertiary amine salt thereof.

References Cited
UNITED STATES PATENTS

| | | | |
|---|---|---|---|
| 3,428,623 | 2/1969 | Keil et al. | 260—210 |
| 3,454,548 | 7/1969 | Keil et al. | 260—210 |

LEWIS GOTTS, Primary Examiner

J. R. BROWN, Assistant Examiner

U.S. Cl. X.R.

99—2, 4; 424—180

PO-1050 (5/69)

UNITED STATES PATENT OFFICE
CERTIFICATE OF CORRECTION

Patent No. 3,547,902       Dated December 15, 1970

Inventor(s) Henry Schmitz and Robert Larry DeVault

It is certified that error appears in the above-identified patent and that said Letters Patent are hereby corrected as shown below:

The formula of claim 1 should read as follows:

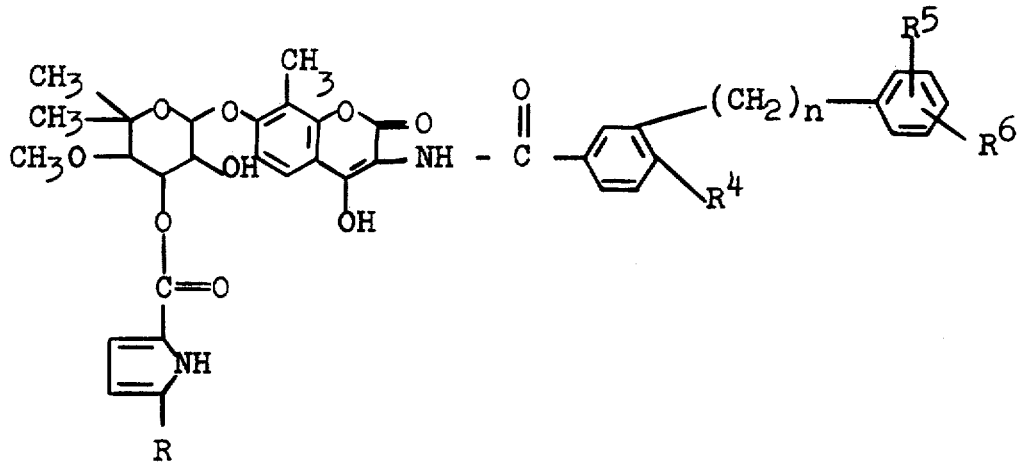

(column 21, lines 19-30)

In column 21, line 33 should read--"or (lower)alkanoyloxy, each of $R^5$ and $R^6$ represents".

SIGNED AND SEALED
MAR 9 1971

(SEAL)
Attest:

Edward M. Fletcher, Jr.
Attesting Officer

WILLIAM E. SCHUYLER, JR.
Commissioner of Patents